United States Patent
Schwent et al.

(10) Patent No.: US 10,448,342 B1
(45) Date of Patent: Oct. 15, 2019

(54) AGGREGATE TRANSMIT POWER LIMITING ON UNCOORDINATED MULTIPLE TRANSMITTER DEVICE

(71) Applicant: MOTOROLA MOBILITY LLC, Chicago, IL (US)

(72) Inventors: Dale Schwent, Shaumburg, IL (US); Armin Klomsdorf, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/165,781

(22) Filed: Oct. 19, 2018

(51) Int. Cl.
H04W 52/30 (2009.01)
H04W 24/02 (2009.01)
H04W 52/24 (2009.01)

(52) U.S. Cl.
CPC .......... *H04W 52/30* (2013.01); *H04W 24/02* (2013.01); *H04W 52/241* (2013.01)

(58) Field of Classification Search
CPC .... H04W 52/30; H04W 52/241; H04W 24/01
USPC ........................................ 455/522
See application file for complete search history.

(56) References Cited

U.S. PATENT DOCUMENTS

| | | | | |
|---|---|---|---|---|
| 6,243,366 B1* | 6/2001 | Bradley | ............ | H04B 7/18532 340/540 |
| 6,947,505 B2* | 9/2005 | Learned | ............ | H04L 1/0054 375/149 |
| 7,020,484 B2* | 3/2006 | Gholmieh | ............ | H04L 1/22 370/232 |
| 7,454,222 B2* | 11/2008 | Huang | ............ | H04L 1/0003 455/226.1 |
| 7,539,507 B2* | 5/2009 | Grob | ............ | H04W 52/06 455/522 |
| 7,616,677 B2* | 11/2009 | Koo | ............ | H04W 52/12 375/141 |
| 7,881,340 B2* | 2/2011 | Farrag | ............ | H04W 74/02 370/468 |

(Continued)

OTHER PUBLICATIONS

Qualcomm Atheros, Inc. "WCN36xO LTE/WLAN/Bluetooth Coexistence", 80N5047-5 Rev. R, 2011.

*Primary Examiner* — Hai V Nguyen
(74) *Attorney, Agent, or Firm* — Yudell Isidore PLLC (57) ABSTRACT

A communication device, method, and computer program product provide communication quality mitigations for concurrently-transmitting transmitters of the multiple transmitter communication device. A controller is communicatively coupled with first and second transmitters. The controller executes a transmit power control utility that enables the communication device to monitor transmission characteristics of first and second transmitters. The controller determines whether a human is within a proximity threshold distance to the first and second transmitters. In response to determining that the human is within the proximity threshold distance, the controller determines whether concurrent transmissions by the first and second transmitters have an aggregated power level that exceeds a power threshold. In response to determining that the aggregated power level exceeds the power threshold, the controller triggers operation in a reduced transmit power mode that reduces the aggregate power level to not exceed the power threshold and that includes communication quality mitigation.

18 Claims, 6 Drawing Sheets

(56) References Cited

U.S. PATENT DOCUMENTS

| | | | | |
|---|---|---|---|---|
| 7,912,492 B2* | 3/2011 | Hays | H04B 7/18543 | 370/230.1 |
| 8,060,129 B2* | 11/2011 | Grob | H04W 52/06 | 455/522 |
| 8,116,351 B2* | 2/2012 | Koo | H04W 52/12 | 375/141 |
| 8,195,167 B1* | 6/2012 | Vargantwar | H04W 16/14 | 370/331 |
| 8,570,888 B1* | 10/2013 | Vargantwar | H04W 52/243 | 370/252 |
| 8,706,061 B2* | 4/2014 | Klomsdorf | H04B 1/525 | 455/114.2 |
| 9,215,686 B2* | 12/2015 | Kazmi | H04B 17/27 | |
| 9,325,462 B2* | 4/2016 | Nakamori | H04L 5/001 | |
| 10,203,762 B2* | 2/2019 | Bradski | G02B 27/225 | |
| 2004/0136393 A1* | 7/2004 | Riveiro Insua | H04B 3/54 | 370/432 |
| 2004/0198406 A1* | 10/2004 | Gholmieh | H04L 1/22 | 455/522 |
| 2005/0288018 A1* | 12/2005 | Huang | H04W 36/00837 | 455/436 |
| 2006/0173663 A1* | 8/2006 | Langheier | G16H 50/20 | 703/11 |
| 2008/0032733 A1* | 2/2008 | Hays | H04B 7/18543 | 455/522 |
| 2010/0056169 A1* | 3/2010 | Koo | H04W 52/12 | 455/450 |
| 2011/0176593 A1* | 7/2011 | Hultell | H04B 7/0404 | 375/224 |
| 2012/0088455 A1* | 4/2012 | Love | H04W 52/243 | 455/67.11 |
| 2012/0134332 A1* | 5/2012 | Lin | H04B 7/0404 | 370/329 |
| 2012/0184265 A1* | 7/2012 | Love | H04W 72/1215 | 455/424 |
| 2012/0184327 A1* | 7/2012 | Love | H04B 1/0064 | 455/552.1 |
| 2013/0163551 A1* | 6/2013 | He | H04W 4/70 | 370/329 |
| 2014/0153671 A1* | 6/2014 | Klomsdorf | H04B 7/0404 | 375/299 |
| 2015/0011236 A1* | 1/2015 | Kazmi | H04B 17/27 | 455/456.1 |
| 2016/0026253 A1* | 1/2016 | Bradski | G02B 27/225 | 345/8 |
| 2016/0135132 A1* | 5/2016 | Donepudi | H04W 4/025 | 370/311 |
| 2016/0192041 A1* | 6/2016 | Pryor | H04Q 9/00 | 340/870.07 |
| 2017/0188411 A1* | 6/2017 | Siomina | H04W 52/0216 | |
| 2017/0208560 A1* | 7/2017 | Papa | H04W 56/006 | |
| 2018/0026481 A1* | 1/2018 | Ku | H04L 25/0226 | 370/329 |
| 2019/0075576 A1* | 3/2019 | Eyuboglu | H04W 72/12 | |
| 2019/0094981 A1* | 3/2019 | Bradski | H04N 13/204 | |
| 2019/0191441 A1* | 6/2019 | Kusashima | H04J 11/0079 | |

* cited by examiner

AGGREGATE TRANSMIT POWER LIMITING ON UNCOORDINATED MULTIPLE TRANSMITTER DEVICE

BACKGROUND

1. Technical Field

The present disclosure relates generally to communication devices with multiple transmitters, and more particularly to communication devices having multiple transmitters that transmit concurrently in a common frequency band.

2. Description of the Related Art

Communication devices, such as smartphones, are capable of communicating via numerous protocols These protocols include: (i) Bluetooth (BT) connections; (ii) Global Positioning System (GPS); (iii) Personal Access Networks (PAN); (iv) Wireless Local Access Networks (WLAN) such as Wireless Fidelity (Wi-Fi); and (v) Wireless Wide Area Networks (WWAN) such as 3rd Generation Partnership Project (3GPP) Long Term Evolution (LTE), etc. To increase the functionality of communication devices, multiple transmitters and receivers are often included to enable simultaneous communication sessions, such as with cellular nodes, Wi-Fi nodes, GPS navigation satellites, etc. Different transmitters may be using the same protocols or even communicating with the same node.

Developments have been announced for leveraging Fifth Generation (5G) higher data rates for certain smartphones by way of an external modem. The external modem, packaged as a modular component, introduces an independently controlled transmitter to an existing multiple transmitter device. The external modem operates as a separate communication device capable of concurrent transmission with transmitters of the attached primary communication device. Inclusion of a mod transmitter increases the transmission power emitted by the transmitters of the overall device.

Single and multiple transmitter communication devices have limits on transmission power. Regulatory requirements limit transmission power level that can reach a person within proximity of a communication device. Generally-known systems cut back the power of at least one transmitter of the communication device during concurrent operation to avoid exceeding the regulatory limit. However, when power cut back is applied indiscriminately, the quality of the signal on the affected transmit channel is reduced, which can negatively affect reception by an intended remote network base station.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

According to aspects of the present innovation, a communication device, a method, and a computer program product provide one or more communication quality mitigations for concurrently-transmitting first and second transmitters of the communication device. A controller of the communication device is communicatively coupled with the first and second transmitters. The controller executes a transmit power control utility that enables the communication device to monitor transmission characteristics of the first and second transmitters. The controller determines whether a human is within a proximity threshold distance of the first and second transmitters. In response to determining that the human is within the proximity threshold distance, the controller determines whether concurrent transmissions by the first and second transmitters have an aggregated power level that exceeds a power threshold. In response to determining that the aggregated power level exceeds the power threshold, the controller triggers operation of one or both of the first and second transmitters in a reduced transmit power mode that reduces the aggregate power level to below the power threshold. Operation in the reduced transmit power mode includes communication quality mitigation. Communication quality mitigation is a selected one of: (i) selecting the one of the first and second transmitters to reduce transmit power based on having a lower priority of communication traffic; (ii) communicating the reduced transmit power levels of the first and second transmitter to a network node to prompt the network node to make a transmission characteristic change; and (iii) assigning all traffic to one transmitter and turning off the other transmitter.

In one aspect of the present disclosure, a method includes monitoring, by a controller, transmission characteristics of first and second transmitters of a communication device. The first and second transmitters are able to concurrently transmit. The method includes determining whether a human is within a proximity threshold distance of the first and second transmitters. In response to determining that the human is within the proximity threshold distance, the method includes determining whether concurrent transmissions by the first and second transmitters have an aggregated power level that exceeds a power threshold. In response to determining that the aggregated power level exceeds the power threshold, the method includes triggering, by the controller, operation in a reduced transmit power mode that reduces the aggregate power level to not exceed the power threshold and that includes communication quality mitigation.

According to one or more aspects of the present disclosure, a computer program product includes program code on a computer readable storage device. When executed by a processor associated with a communication device, the program code enables the communication device to: (i) monitor transmission characteristics of concurrently-transmitting first and second transmitters of a communication device; (ii) determine whether a human is within a proximity threshold distance to the first and second transmitters; (iii) in response to determining that the human is within the proximity threshold distance, determine whether concurrent transmissions by the first and second transmitters have an aggregated power level that exceeds a power threshold; (iv) in response to determining that the aggregated power level exceeds the power threshold, trigger operation in a reduced transmit power mode that reduces the aggregate power level to not exceed the power threshold and that includes communication quality mitigation.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

The description of the illustrative embodiments can be read in conjunction with the accompanying figures. Embodiments incorporating teachings of the present disclosure are shown and described with respect to the figures presented herein.

Figure 1:
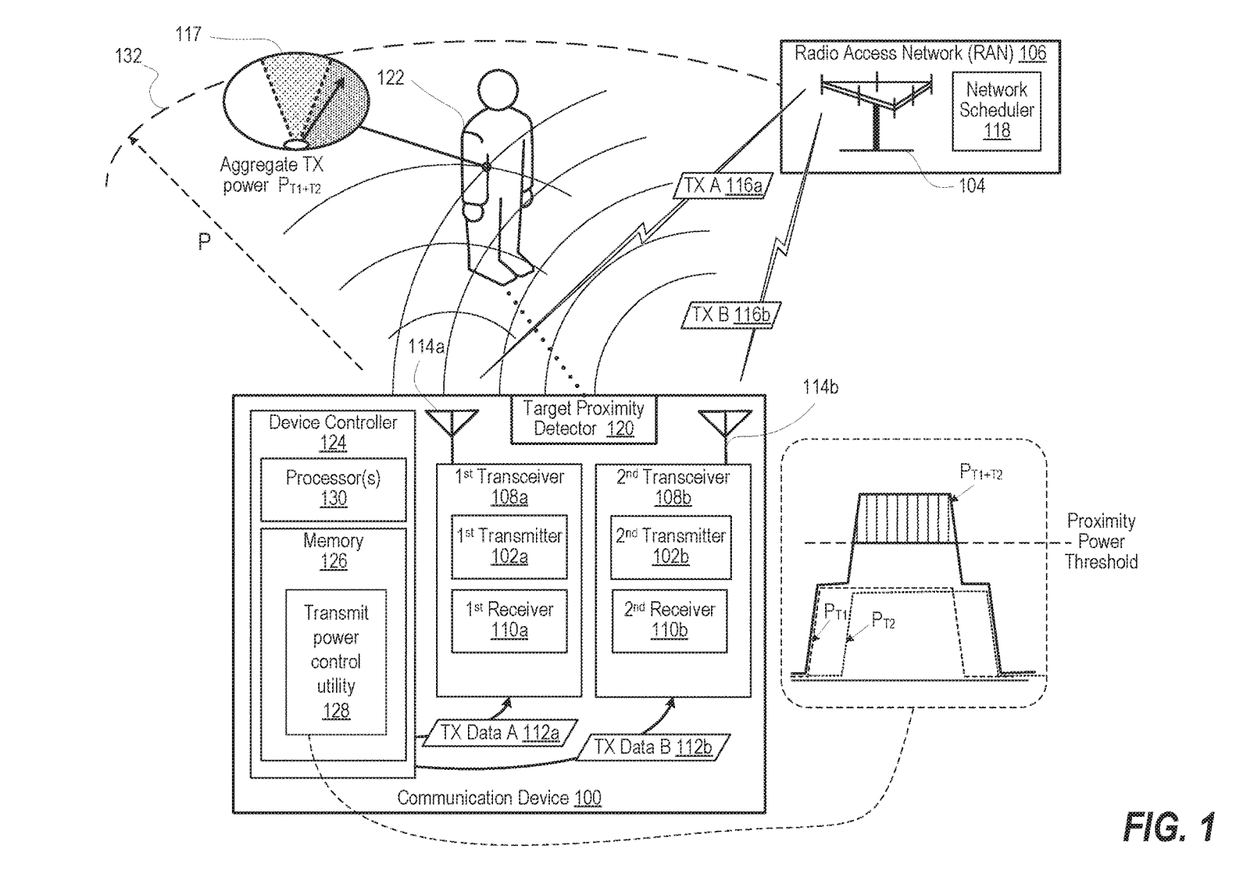
FIG. 1 is a simplified functional block diagram illustrating a communication device having first and second transmitters that can transmit concurrently, according to one or more embodiments.

FIG. 1 is a simplified functional block diagram illustrating communication device 100 having first and second transmitters 102a and 102b that can transmit concurrently to one or more network entities, such as node(s) 104 of radio access node (RAN) 106. For clarity, only two transmitters 102a and 102b are illustrated. Aspects of the present disclosure for limiting aggregate transmit power with communication quality mitigations can be applied to having three or more transmitters. First transceiver 108a includes first transmitter 102a and first receiver 110a. Second transceiver 108b includes second transmitter 102b and second receiver 110b. First and second transceivers 108a and 108b respectively communicate transmit (TX) data traffic A-B 112a and 112b over a dedicated or shared antenna system represented by individual antennas 114a and 114b.

First and second transmitters 102a and 102b respectively have first and second transmit power setting, $P_{T1}$ and $P_{T2}$. First and second transmit power setting, $P_{T1}$ and $P_{T2}$, can individually remain under a proximity power threshold within a proximity distance "P" from communication device 100. First and second transceivers 108a and 108b have at least a degree of autonomy from other transceiver 108a and 108b in being scheduled, requesting scheduling, or selecting scheduling of uplink transmissions A-B 116a and 116b respectively to node(s) 104. Concurrently scheduled uplink transmissions A-B 116a and 116b can thus occur. The measure of compliance to the regulatory limit becomes the aggregate transmission power 117, $P_{T1}+P_{T2}$, of concurrently transmitting first and second transmitters 102a and 102b rather than the individual power settings, $P_{T1}$ and $P_{T2}$. In response to determining that the aggregate transmission power exceeds a proximity power threshold, first and second transmitters 102a and 102b limit the aggregate transmission power to remain compliant. Communication device 100 also provides communication quality mitigation to compensate at least in part for any degradation in communication quality due to reduced transmission power.

Device controller 124 is communicatively coupled with first and second transceivers 108a and 108b. Device controller 124 provides TX data traffic A-B 112a and 112b and monitors transmission characteristics. Device controller 124 utilizes one or more computer readable storage devices, represented by memory 126. Memory 126 contain program code, such as transmit power control utility 128. Processor(s) 130 associated with device controller 124 execute the program code to enable communication device 100 to provide functionality for communication quality mitigation to compensate for reduced transmit power. Device controller 124 reduces transmit power in response to aggregate transmit power exceeding a power threshold due to concurrent transmission by first and second transceivers 108a and 108b.

Communication device 100 can include functional components that function directly or indirectly as a target proximity detector 120 of human 122. Target proximity detector 120 can actively emit energy such as ultrasonic or RF signals or passively receive signals such as infra-red, acoustic sound, or visible imagery. In one or more embodiments, target proximity detector 120 is a microphone that detects loudness of audible commands or other speech by human 122. In one or more embodiments, target proximity detector 120 is a camera or other image capturing device in the visual or infra-red spectrums that enables recognition of a human-shaped target. In one or more embodiments, target proximity detector 120 is an antenna impedance sensor that detects an electromagnetic interaction with one or more antennas 114a and 114b such as due to touching or proximity of human 122. In one or more embodiments, target proximity detector 120 is a range-finding sensor that transmits a signal that bounces back from human 122. In one or more embodiments, target proximity detector 120 is an application that detects a reflected back scattered return of transmissions from antennas 114a and 114b that corresponds to human 122 being close to communication device 122. In one or more embodiments, target proximity detector 120 is a user interface device that requires user proximity to receive user inputs, such as control key or touch screen activations. In one or more embodiments, target proximity detector 120 is a communication link to a peripheral device carried by human 122, such as a Bluetooth-connected headphone. In one or more embodiments, target proximity detector 120 is accelerometer sensors incorporated into communication device 100 that detect motions indicative of communication device 100 being hand carried.

Determining whether a target is human can be made with varying degrees of confidence or certainty. In one embodiment, facial recognition can provide a high degree of certainty that the target is not only human, but also an approximate distance from the communication device 100. In one embodiment, a range-finding detector may detect an object with an accurate measurement of range but be unable to determine to a high degree of certainty whether the object is human. Communication device 100 can default to treating targets that are possibly human as human in such instances.

Using target proximity detector 120, controller 124 determines whether an object that is determined to be human 122 is within proximity threshold distance 132 for which aggregate power control is warranted. In one or more embodiments, controller 124, via target proximity detector 120, determines the aggregate transmission power exposure to human 122 based on the aggregate transmit power level of first and second transceivers 108a and 108b and a distance, P, that human 122 is from communication device 100.

Controller 124 determines whether human 122 is within proximity threshold distance 132 to first and second transceivers 108a and 108b. In response to determining that human 122 is within proximity threshold distance 132, controller 124 determines whether concurrent uplink transmissions A-B 116a and 116b by first and second transmitters 108a and 108b have an aggregated power level that exceeds a power threshold. In response to determining that the aggregated power level exceeds the power threshold, controller 124 triggers operation in a reduced transmit power mode that reduces the aggregate power level to not exceed the power threshold and that includes communication quality mitigation. Communication quality mitigation is a selected one of: (i) selecting one of first and second transmitters 108a and 108b to reduce transmit power based on having a lower priority of traffic; (ii) communicating the reduced transmit power levels of the first and second transmitter to a network node to prompt the network node to make a transmission characteristic change; and (iii) assigning all traffic to one transmitter and turning off the other transmitter.

In one or more embodiments, controller 124 responds to proximity threshold distance 132 as a trigger to reduce aggregate transmission power to a predefined level. In one or more embodiments, controller 124 determines the predetermined level based on calculating or looking up an aggregate transmission power level based on proximity threshold distance 132. An increase in proximity threshold distance 132 enables a larger aggregate transmission power level.

Generally-known devices limit aggregate transmission power by lowering transmit power of all concurrently transmitting antennas. In one or more embodiments according to the present disclosure, limiting aggregate transmission power is achieved at least in part by directing aggregate transmission power away from human 122. Transmission characteristics of antennas 114a and 114b are known and used in adjusting transmit power settings and limits. For example, antennas 114a and 114b can have an efficiency that is a function of frequency and direction. In addition, antennas 114a and 114b can be used with active impedance matching that is selectively employed and which changes the antenna efficiency. In one or more embodiments, antennas 114a and 114b are used in a multiple-input multiple-output (MIMO) antenna subsystem that is used to provide spatial diversity. RF power decreases quickly with increasing distance from communication device 100 as the RF beam widens. The proximity power threshold can thus be a factor of one or more settings or measurements that accommodate these changes in actual aggregate transmit power 117, $P_{T1}+P_{T2}$. In one or more embodiments, controller 124 can determine whether any directivity of uplink transmissions A-B 116a and 116b relative to human 122 affects a magnitude of the aggregate transmission power.

In one or more embodiments, controller 124 triggers operation in the reduced transmit power mode by enabling communication device 100 to reduce the transmit power level of at least one of first and second transmitters 108a and 108b. In one or more embodiments, controller 124 triggers operation in the reduced transmit power mode by enabling communication device 100 to communicate the transmit power levels of first and second transmitters 108a and 108b to at least one network node 104 that schedules communication with first and second transmitters 108a and 108b. In one or more embodiments, controller 124 triggers operation in the reduced transmit power mode by enabling communication device 100 to receive, from at least one network node 104, a transmission characteristic change for selected one of first and second transmitters 108a and 108b. Communication device 100 implements the transmission change to optimize communication quality at the reduced transmit power level. In one or more embodiments, the transmission characteristic change includes at least one of: (i) coding gain; (ii) data rates; and (iii) transmission times for the selected one of first and second transmitters 108a and 108b to optimize communication quality at the reduced transmit power level. Coding gain is instructing respective transmitter 108a and 108b to include a more robust error correction code with the data so that increased error rates that occur during transmission and reception due to reduced transmission power can be corrected. Reducing data rates can make detection of the data state easier for the receiving network. Changing transmission times for first and second transmitters 108a and 108b can avoid concurrent transmissions. In one or more embodiments, controller 124 responds to the transmission characteristic change by increasing the transmit power level of at least one of first and second transmitters 108a and 108b.

In one or more embodiments, controller 124 triggers operation in the reduced transmit power mode by reducing transmit power level of a selected one of first and second transmitters 108a and 108b based on the selected one having a lower priority of traffic than the other transmitter. Communication sessions that require low latency for quality of service (QoS) can be maintained with prioritization of transmissions. Lower priority communication sessions that do not affect, or minimally affect, QoS can be delayed or deferred to reduce aggregate transmission power.

In one or more embodiments, controller 124 triggers operation in the reduced transmit power mode by enabling communication device 100 to assign all traffic scheduled for first and second transmitters 108a and 108b to a selected one of transmitters 108a and turning off other transmitter 108b.

Figure 2:
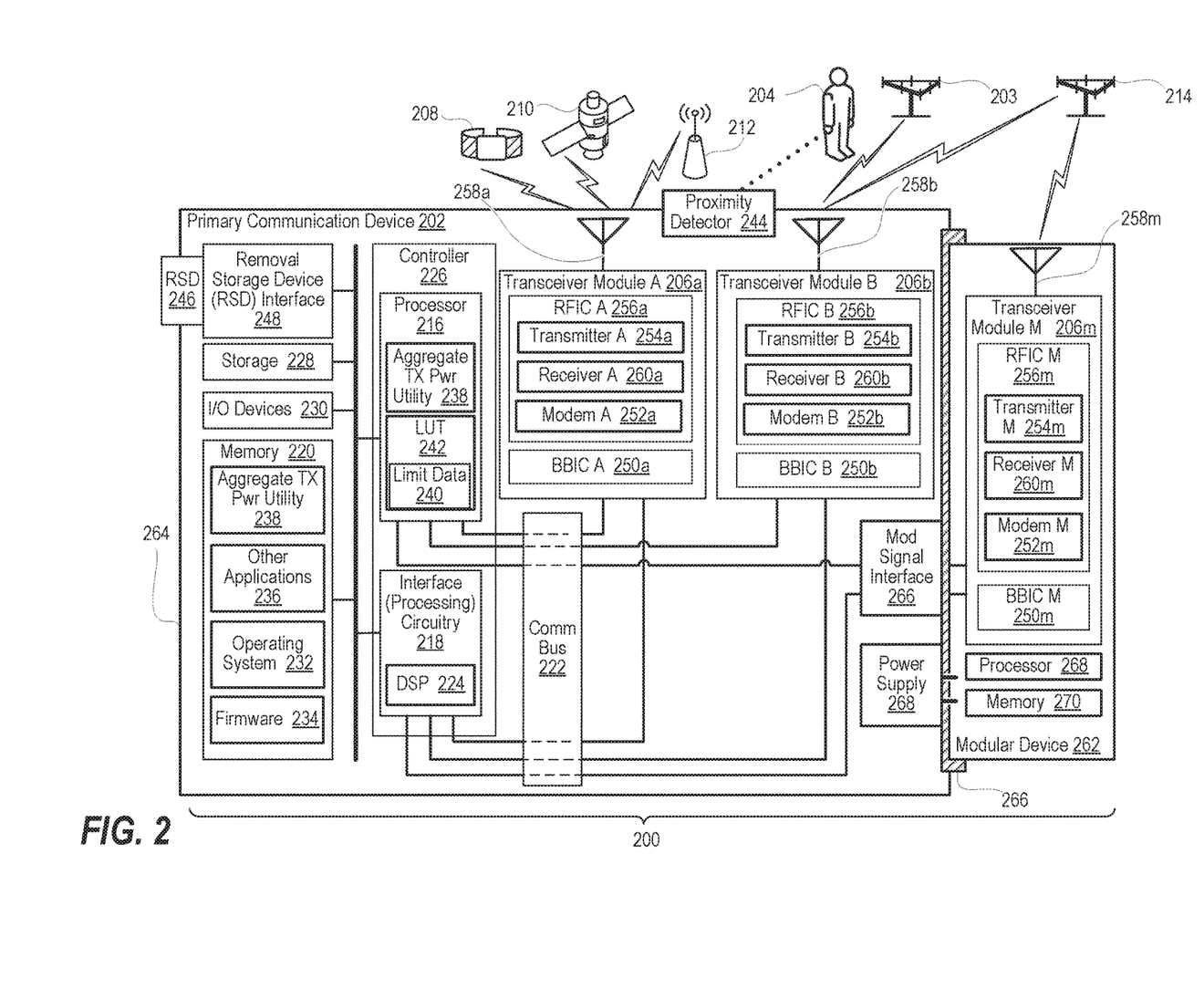
FIG. 2 is a functional block diagram illustrating an example communication device having both a primary and a modular component, and within which certain of the functional aspects of the described embodiments may be implemented.

With specific reference now to FIG. 2, there is depicted a block diagram of an example wireless communication device 200, within which the functional aspects of the described embodiments may be implemented. Wireless communication device 200 transmits and receives RF signals over an air interface via uplink and/or downlink channels between wireless communication device 200 and communication network equipment. In one or more embodiments, wireless communication device 200 can be a mobile cellular device/phone or smartphone, or laptop, netbook or tablet computing device, or other types of communication devices.

Communication device 200 includes primary communication device 202 and may wholly comprise primary communication device 202 without any peripheral or augmenting devices. Primary communication device 202 enables communication with fourth generation (4G) cellular network equipment 203 and enables user 204 to interact with communication device 200. Primary communication device 202 includes first transceiver module A 206a that communicates with one or more of a personal access network (PAN) device such as smartwatch 208 via a Bluetooth wireless link, global positioning system (GPS) satellite 210, and node 212 of a wireless local access network (WLAN). Primary communication device 202 includes transceiver module B 206b that communicates with base station 214 or other network nodes with similar operating frequency bands.

Primary communication device 202 includes processor 216 and interface (processing) circuitry 218, which are connected to memory 220 via an interconnect such as communication bus 222. Interface circuitry 218 includes digital signal processor (DSP) 224. Processor 216 and interface (processing) circuitry 218 can be referred to as controller 226. Controller 226 controls the communication, user interface, and other functions and/or operations of wireless communication device 200. These functions and/or operations thus include, but are not limited to including, application data processing and signal processing. Wireless communication device 200 may use hardware component equivalents such as special purpose hardware, dedicated processors, general purpose computers, microprocessor-based computers, micro-controllers, optical computers, analog computers, dedicated processors and/or dedicated hard wired logic. The various hardware components within wireless communication device 200 can be electrically and/or communicatively coupled together, as illustrated in FIG. 2. As utilized herein, the term "communicatively coupled" means that information signals are transmissible through various interconnections between the components including wireless links. The interconnections between the components can be direct interconnections that include conductive transmission media or may be indirect interconnections that include one or more intermediate electrical components. Although certain direct interconnections are illustrated in FIG. 2, it is to be understood that more, fewer or different interconnections may be present in other embodiments.

Primary communication device 202 includes storage 228. Also illustrated within primary communication device 202 are input/output (I/O) devices 230. Memory 220 of primary communication device 202 can include volatile memory and/or non-volatile memory. Memory 220 stores program code or software, such as operating system 232, as well as firmware 234. One or more other executable applications 236 can be stored within memory 220 for execution by controller 226, such as an aggregate transmit power utility 238 that monitor aggregate transmission power levels. Regulatory transmit power limit data 240 can be stored as data, such as within a lookup table (LUT) 242, in memory 238. Proximity detector 244 provides information to controller 226 of whether a person is within a certain proximity distance to wireless communication device 200.

Aggregate transmit power utility 238 and other software and data necessary to perform aspects of the present disclosure can be stored on a computer readable storage device, such as removable storage device (RSD) 246. In one or more embodiments, RSD 246 is received in RSD interface 248 of primary communication device 202. RSD 246 is a computer readable storage device. RSD 246 can be accessed by controller 226 to provision wireless communication device 200 with program code that, when executed by controller 226, provides the functionality to wireless communication device 200 to perform aggregate transmit power limitation for concurrent transmissions.

Transceiver modules A and B 206a and 206b include a respective baseband integrated circuit (BBIC) A and B 250a and 250b and radio frequency integrated circuit (RFIC) A and B 256a and 256b. RFICs A and B 256a and 256b include respective modems A and B 252a and 252b, RF transmitters A and B 256a and 256b, and RF receivers A and B 260a and 260b. BBIC A and B 250a and 250b are communicatively coupled via communication bus 222 to controller 226 to receive baseband data traffic. BBIC A and B 250a and 250b send baseband data traffic to RFICs A and B 256a and 256b. Modems A and B 252 and 252b encode the baseband data traffic for transmission with appropriate communication protocols. RF transmitters A and B 256a and 256b respectively of transceiver modules A and B 206a and 206b modulate the output of modems A and B 252a and 252b, respectively, on RF carriers for transmission by antennas 258a and 258b. RF receivers A and B 260a and 260b, respectively of transceiver modules A and B 206a and 206b, demodulate the signals received respectively on RF carriers by antennas 258a and 258b. The demodulated signals are decoded by modems A and B 252a and 252b.

In operation, transceiver modules A and B 206a and 206b can perform generally-known Wi-Fi coexistence management to reduce interference with either of the primary or modular radio that operates on an adjacent band such as Long Term Evolved (LTE) bands 7, 40, and 41. For example, Wi-Fi radio can perform one or more of the following operations: (i) Wi-Fi radio avoids channels that cause interference in each instance where the Wi-Fi radio is allowed to do so; (ii) when an interfering channel cannot be avoided, Wi-Fi radio backs off power during LTE reception by one of the primary and mod cellular radios if sufficient radio desense occurs; (iii) when interfering channel cannot be avoided, Wi-Fi radio backs off power during Wi-Fi setup; (iv) when interfering channel cannot be avoided and one of the primary and mod cellular radios is transmitting LTE protocol uplink by time division duplex (TDD), Wi-Fi radio will avoid, to the extent possible, concurrent transmitting; and (v) when interfering channel cannot be avoided and one of the primary and mod cellular radios is transmitting LTE protocol uplink by TDD, Wi-Fi radio will avoid receiving, to the extent possible. However, the generally-known Wi-Fi coexistence management techniques are not meant to address, nor are such techniques sufficient, to avoid occurrences of excessive aggregate transmission power.

Primary communication device 202 includes electrical interfaces and mechanical mounting features for receiving one of one or more types of modular ("mod") devices 262 that augment or extend the functionality of primary communication device 202. Communication device 200 becomes the combination of primary communication device 202 and mod device 262. Examples of mod devices include a stereo loud speaker, a display projector, a mobile printer, a voice commanded smart speaker, a gamepad, a style shell, a 360 camera, a power pack, a camera with 10× optical zoom, a wireless charging shell, a custom developed mod, etc. In an exemplary embodiment, mod device 262 provides fifth generation (5G) cellular data communication capabilities. Housing 264 of primary communication device 202 includes mounting surface 266 that is shaped to conform to and engage with mod housing 268 of mod device 262. Mod signal interface 266 and power supply 268 of primary communication device 202 provide communication and power, respectively, through mounting surface 262 to mod device 262. In the illustrative embodiment, mod device 262 includes later generation communication capabilities, such as RF transceiver M 206m, which enables higher data rate 5G communication with base station 220 of a wireless wide area access network (WWAN). When mod device 262 is physically engaged to primary communication device 202, RF transceiver M 206m becomes available to the controller 226 for communication. In one or more embodiments, magnets embedded in the mod device 262 are attracted to ferrous material of the housing 264 to create engagement between communication device 202 and mod device 206. Mod signal interface 266 and power supply 268 of primary communication device 202 present electrical contact pads that align with electrical contact pins of mod housing 268. Primary communication device 202 and attached mod device 262 form wireless communication device 200. When mod device 262 is physically disengaged from primary communication device 202, mod device 262 can be used as a personal Wi-Fi hotspot by transceiver A 206a of communication device 202.

Mod device 262 includes transceiver module M 206m that communicates with base station 220. Transceiver module M 206m includes a BBIC M 250m that is communicatively coupled via communication bus 222 to controller 226. Baseband data traffic is encoded for transmission and decoded during receiving by modems A and B 252 and 252b with appropriate communication protocols respectively by radio frequency integrated circuit (RFIC) A and B 254a and 254b of transceiver modules A and B 206a and 206b. RF transmitters A and B 256a and 256b respectively of transceiver modules A and B 206a and 206b modulate the output of modems A and B 252a and 252b respectively on RF carriers for transmission by antennas 258a and 258b. RF receivers A and B 260a and 260b respectively of transceiver modules A and B 206a and 206b demodulate the signals received respectively on RF carriers by antennas 258a and 258b. The demodulated signals are decoded by modems A and B 252a and 252b. Mod processor 268 and memory 270 on mod device 262 can augment or perform certain autonomous functions for controller 226 of primary communication device 202.

In one or more embodiments, mod device 262 is able to transmit within the same band at the same time as primary communication device 202. Either controller 226 of primary communication device 202 or processor 262 of mod device 262 can function as a master controller. For clarity, the present disclosure describes controller 226 as the master controller that coordinates the actions of two transmitters, such as transceivers A and M 258a and 258m, that can have an aggregate transmit power above a proscribed limit. Processor 262 of mod device 26 remote and communicates transmit power and on/off state information of all active transmitters of mod device 262 to controller 226. Controller 226 receives proximity data, which is typically caused by an operator of wireless communication device 200, although third parties can also be sensed. Controller 226 can receive information via communication bus 240, including whether mod device 262 is engaged and active. In one or more embodiments, mod device 262 can operate independently from primary communication device 202, such as acting as a remote 5G hotspot. Controller 226 also has information about on/off state and transmit power for transmitters within primary communication device 202. Controller 226 references a LUT in transmit power limit data 274 to see what the appropriate maximum power reduction of each transmitter should be to remain within any proscribed limits for each set of conditions.

In one or more embodiments, an appropriate communication mitigation mode can depend on whether or not the mod device 262 is attached or detached. For example, mod device 262 may not transmit on a cellular uplink when detached, obviating the need for certain mitigation techniques for aggregate transmission power limitation. Intermodulation between transceivers A, B, and M 206a, 206b and 206m may be significantly reduced with distance when mod device 262 is detached. Antenna impedance at various frequencies and differences in regulatory limits as a function of frequency and transmit power to affect what transmission characteristics are problematic. Empirical testing can pre-characterize an operational state as problematic as defined by combinations of component states, sensor readings, and settings for transmission/reception characteristics. Each problematic operational state can be associated with one or more mitigations. The operational states identified by one or more inputs such as transmit status, mod attachment status, sensor reading, etc., and the corresponding mitigation(s) are captured in LUT 275 for operational use of transceivers A, B, and M 206a, 206b and 206m. Additional inputs to the LUT 275 may be the type of traffic carried by each active transmitter (voice, data, etc.), which may be used to prioritize which transmitter powers are reduced and by how much, as aggregate transmission power at a particular distance can be reduced by dropping the maximum power of any of the active transmitters by an appropriate amount. For example, if voice traffic is being carried by primary communication device 202 and data traffic is being carried by mod device 262, power for mod device 262 can be selected for reduction to meet aggregate transmit power limits while power is maintained for primary communication device 202. Using LUT 275, controller 226 can maintain quality of service (QoS) for voice communication to preserve the best user experience. Reduction in data rate would be less noticeable than loss of voice quality.

To mitigate reduced radio link performance, controller 226 can inform a receiving network, such as base station 220, of the need to reduce transmit power. In response, Network (base station 220) can dictate changes in transmission characteristics, such as adjusting coding gains or data rates, to maintain or at least improve link performance at the reduced transmit power level. In addition, network (base station 220) can adjust transmit times so that concurrent transmissions by transceivers A, B, and M 206*a*, 206*b* and 206*m* of wireless communication device 200 are avoided, allowing each transmitter to operate at a power level that is not affected by another transmitter.

In one or more embodiments, instead of reducing transmit power of one of primary communication device 202 and mod device 262, controller 226 can turn off one or more transmitters A, B, and M 254*a*, 254*b*, and 254*m*, diverting traffic to a remaining active transmitter. For example, transmitter M 254*m* of mod device 262 can be used for 5G high-speed data communication only and transmitter B 254*b* of primary communication device 202 can be transmitting using 4G at a lower speed of data communication. Controller 226 can select one of the two transmitters B and M 254*b* and 254*m* to transmit and turn off the other.

Figure 3:
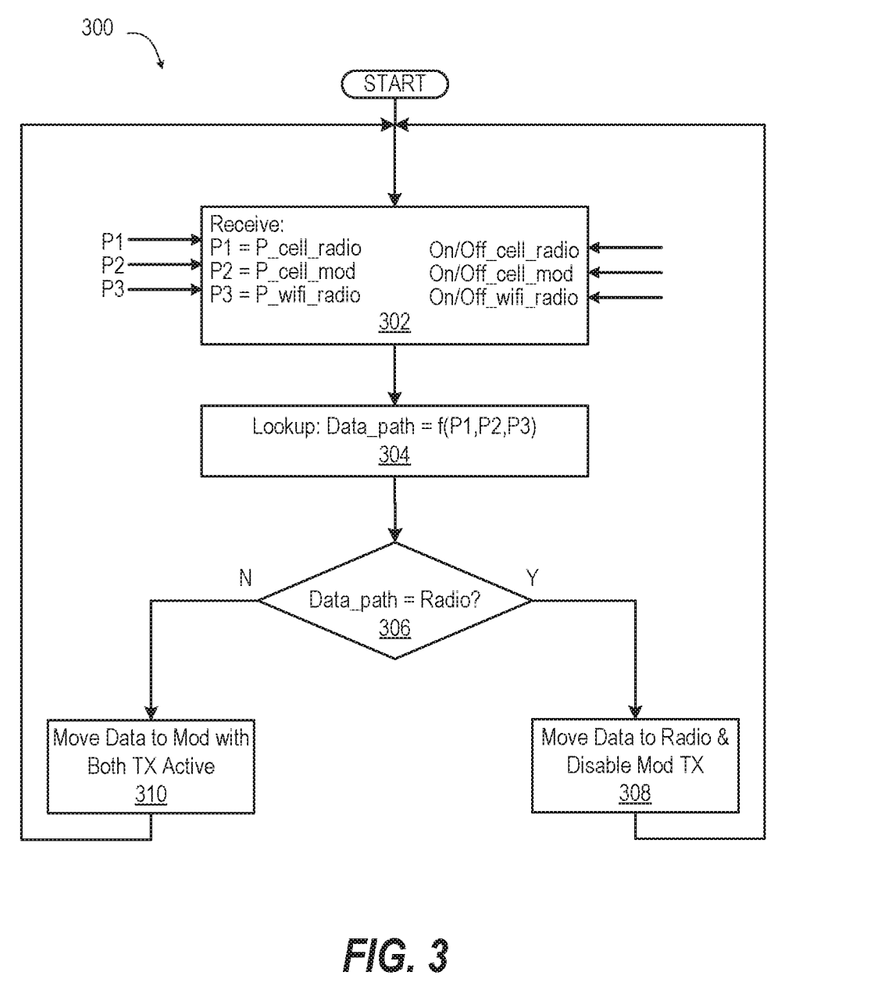
FIG. 3 is a flow chart illustrating a method for controlling aggregate transmission power for a three-transmitter device, according to one or more embodiments.

FIG. 3 is a functional block diagram illustrating example method 300 for controlling aggregate transmission power for a three-transmitter device. In one or more embodiments, method 300 includes receiving, by a controller, status information, P_cell_radio, P_cell_mod, and P_wifi_radio, respectively, for transmit power P1-P3 and on/off status respectively for a primary cellular radio (P_cell_radio), a modular cellular radio (P_cell_mod), and a Wi-Fi radio (P_wifi_radio) (block 302). Method 300 includes looking up, by the controller, what the appropriate data path (Data_path) is according to a LUT based on the inputs P1-P3 (block 304).

A determination is made as to whether the appropriate data path is primary cellular radio (decision block 306). In one or more embodiments, the determination is based on data received from accessing LUT 242 (FIG. 2). In response to determining that the appropriate data path is primary cellular radio for all traffic, data from modular cellular radio is moved to primary cellular radio and transmission by modular cellular radio is disabled (block 308). Then method returns to block 302. In response to determining that the appropriate data path is not primary cellular radio for all traffic, data from primary cellular radio is moved to modular cellular radio and transmission by both primary and modular cellular radios are enabled (block 310). Then method returns to block 302. In one or more embodiments, modular cellular radio has a higher communication data rate than primary cellular radio. Moving data to modular cellular radio allows modular cellular radio to operate at a higher transmit power level than if limited by concurrent transmission by primary cellular radio. Modular cellular radio is capable of transmitting a substantial portion of the data. Primary cellular radio is enabled for other types of communications, such as voice sessions or Wi-Fi communication at lower transmit power levels.

Figure 4:
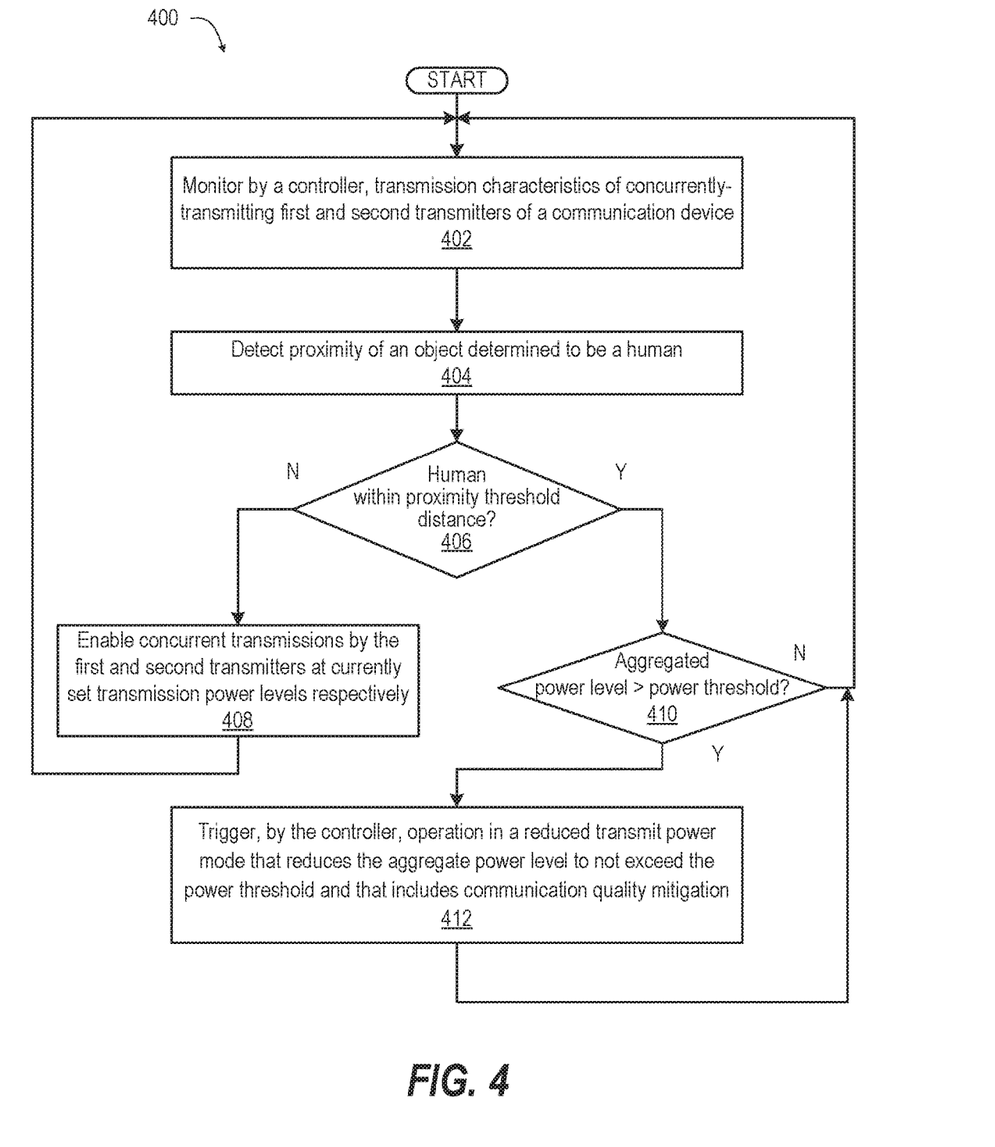
FIG. 4 is a flow chart illustrating a method for determining and implementing communication quality mitigation when aggregate transmit power of multiple simultaneously-transmitting transmitters would exceed an aggregate transmit power threshold, according to one or more embodiments.

FIG. 4 is a flow diagram illustrating method 400 for determining and implementing communication quality mitigation when aggregate transmit power from simultaneously transmitting on multiple transmitters would exceed an aggregate transmit power threshold. In one or more embodiments, method 400 includes monitoring, by a controller of a communication device, transmission characteristics of concurrently-transmitting first and second transmitters (block 402). Method 400 includes detecting proximity of an object that is determined to be a human (block 404). Method 400 includes determining whether the human is within a proximity threshold distance to the first and second transmitters (decision block 406). In response to determining that the human is not within the proximity threshold distance, method 400 includes enabling concurrent transmissions by the first and second transmitters at currently set transmission power levels respectively (block 408). Then method 400 returns to block 402 to continue monitoring for a need for communication quality mitigation in response to proximity of a human. In response to determining in decision block 406 that the human is within the proximity threshold distance, a determination is made as to whether concurrent transmissions by the first and second transmitters have an aggregated power level that exceeds a power threshold (decision block 410). In response to determining that the aggregated power level does not exceed the power threshold, method 400 returns to block 402 to continue monitoring for a need for communication quality mitigation in response to proximity of a human. In response to determining that the aggregated power level exceeds the power threshold, method 400 includes triggering, by the controller, operation in a reduced transmit power mode that reduces the aggregate power level to not exceed the power threshold and that includes communication quality mitigation (block 412). Then, method 400 returns to block 402 to continue monitoring for a need for communication quality mitigation in response to proximity of a human.

In one or more embodiments, communication quality mitigation is a selected one of: (i) selecting the one of the first and second transmitters to reduce transmit power based on having a lower priority of traffic; (ii) communicating the reduced transmit power levels of the first and second transmitter to a network node to prompt the network node to make a transmission characteristic change; and (iii) assigning all traffic to one transmitter and turning off the other transmitter.

Figure 5A:
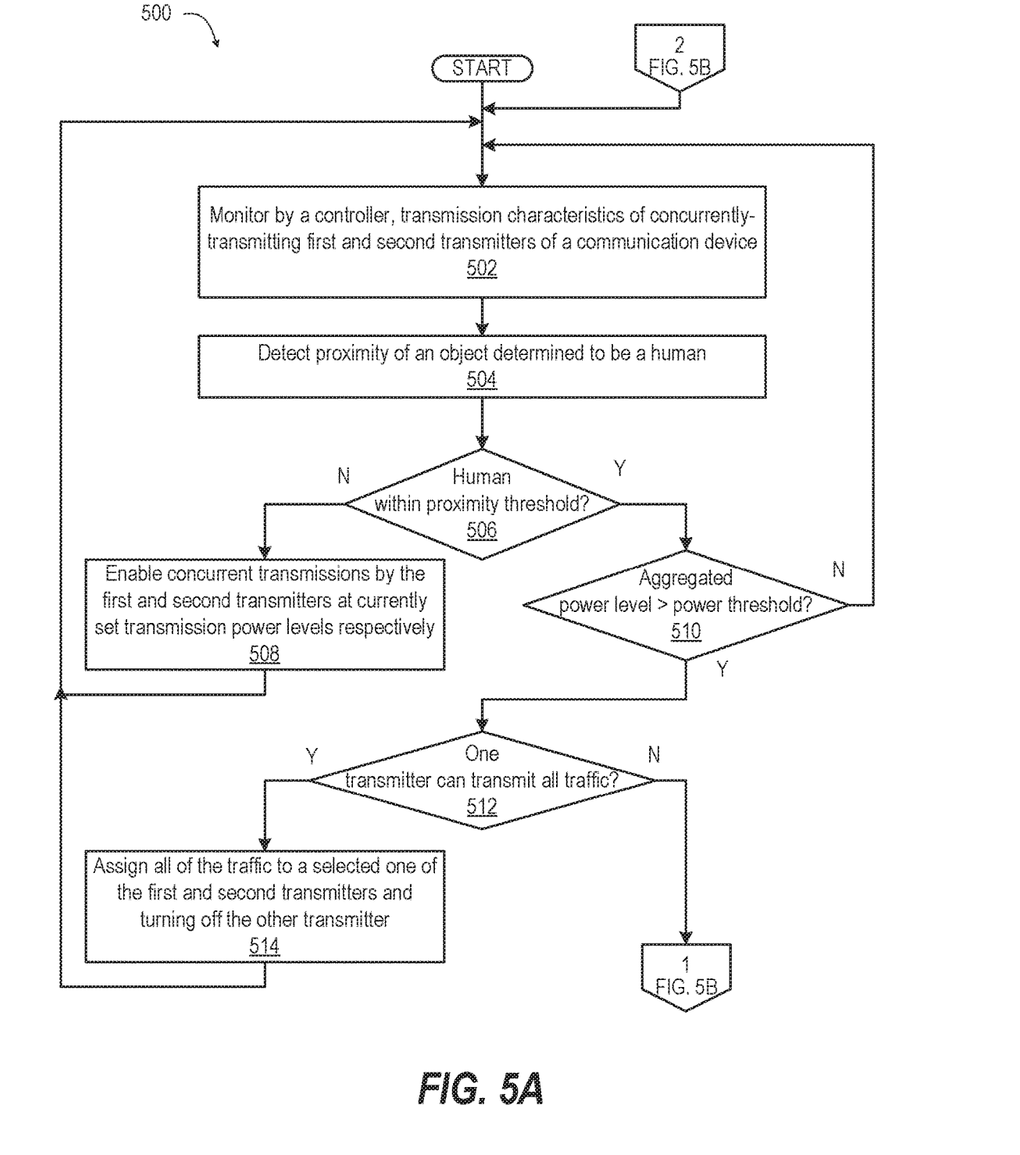
FIGS. 5A-B are a flow chart illustrating a method for selecting an appropriate communication quality mitigation in response to a reduction aggregate transmission power when the communication device is in the proximity of a human, according to one or more embodiments.
Figure 5B:
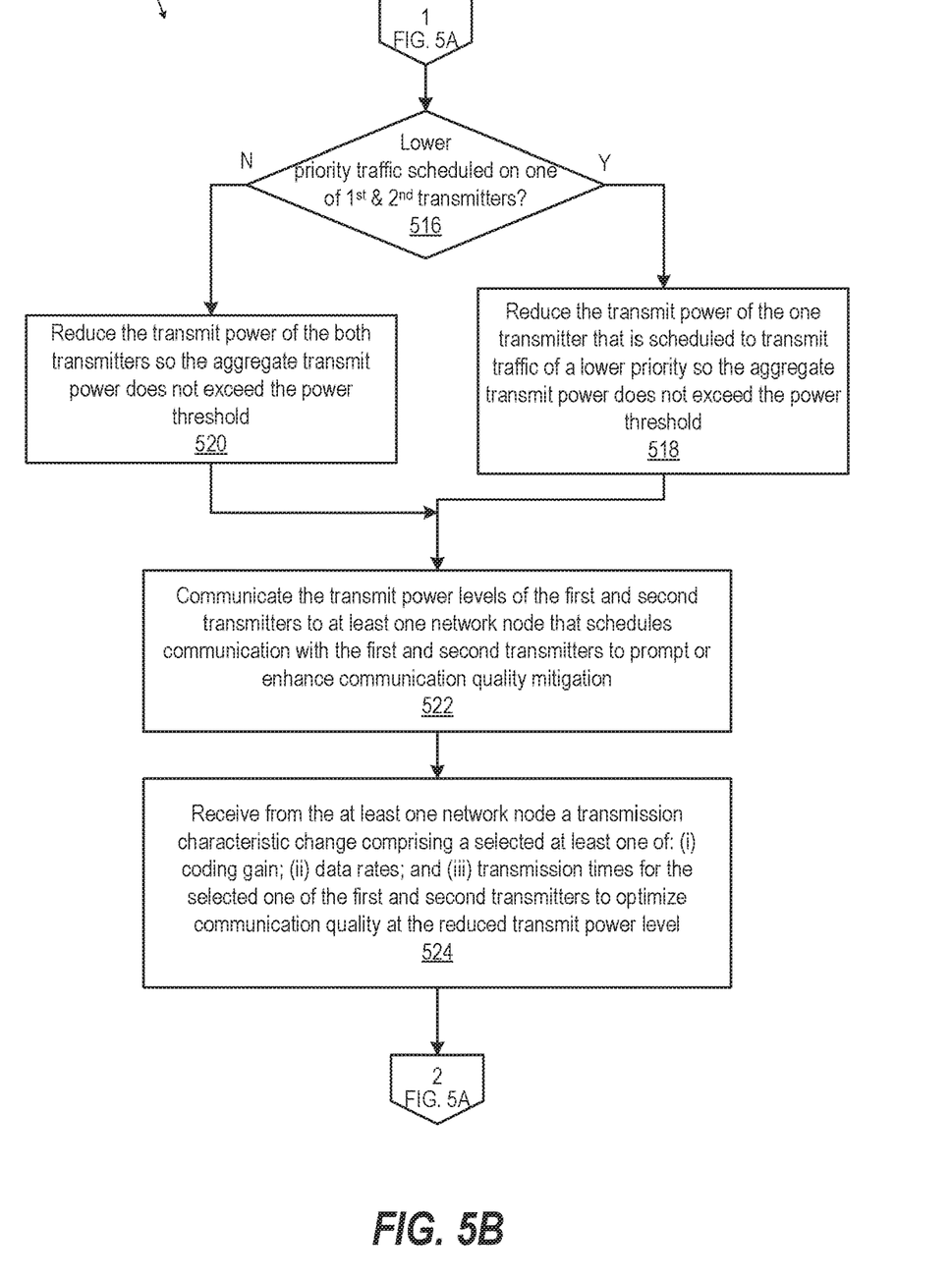

FIGS. 5A-B are a flow diagram illustrating a method 500 for selecting an appropriate communication quality mitigation in response to a reduction in aggregate transmission power in the proximity of a human. With reference to FIG. 5A, method 500 includes monitoring, by a controller, transmission characteristics of first and second transmitters of a communication device that concurrently transmit (block 502) Method 500 includes detecting proximity of an object that is determined to be a human (block 504). Method 500 includes determining whether a human is within a proximity threshold distance to the first and second transmitters (decision block 506). In response to determining that the human is not within the proximity threshold distance, method 500 includes enabling concurrent transmissions by the first and second transmitters at currently set transmission power levels respectively (block 508). Then method 500 returns to block 502 to continue monitoring for a need for communication quality mitigation in response to detecting proximity of a human. In response to determining in decision block 504 that the human is within the proximity threshold distance, a determination is made as to whether concurrent transmissions by the first and second transmitters have an aggregated power level that exceeds a power threshold (decision block 510). In response to determining that the aggregated power level does not exceed the power threshold, method 500 returns to block 502 to continue monitoring for a need for communication quality mitigation. In response to determining that the aggregated power level exceeds the power threshold, method 500 includes determining whether one transmitter can transmit all of the traffic assigned to both the first and second transmitters (decision block 512). In response to determining that one transmitter can transmit all of the traffic assigned to both the first and second transmitters, method 500 includes assigning all of the traffic to a selected one of the first and second transmitters and turning off the other transmitter (block 514). Then method 500 returns to block 502 to continue monitoring for a need for communication quality mitigation in response to proximity of a human. Method 500 continues in FIG. 5B. In response to determining that one transmitter cannot transmit all of the traffic assigned to both the first and second transmitters, method 500 includes determining whether one of the first and second transmitters is scheduled to transmit traffic of lower priority than the other transmitter (decision block 516). In response to determining that one of the first and second transmitters is scheduled to transmit traffic of lower priority than the other transmitter, method 500 includes reducing the transmit power of the one transmitter that is scheduled to transmit traffic of a lower priority, so that the aggregate transmit power does not exceed the power threshold (block 518). In response to determining that neither one of the one of the first and second transmitters is scheduled to transmit traffic of lower priority than the other one, method 500 includes reducing the transmit power of both transmitters so the aggregate transmit power does not exceed the power threshold (block 520). In response to reducing aggregate transmit power in either block 518 or block 520, method 500 includes communicating the transmit power levels of the first and second transmitters to at least one network node that schedules communication with the first and second transmitters to prompt or trigger the network node to provide communication quality mitigation (block 522). Method 500 includes controller receiving from the at least one network node a transmission characteristic change comprising at least one of: (i) coding gain; (ii) data rates; and (iii) transmission times for the selected one of the first and second transmitters to optimize communication quality at the reduced transmit power level (block 524). Then method 500 returns to block 502 (FIG. 5A) to continue monitoring for a need for communication quality mitigation.

In each of the above flow charts presented herein, certain steps of the methods can be combined, performed simultaneously or in a different order, or perhaps omitted, without deviating from the spirit and scope of the described innovation. While the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

Aspects of the present innovation are described below with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiment was chosen and described in order to best explain the principles of the innovation and the practical application, and to enable others of ordinary skill in the art to understand the innovation for various embodiments with various modifications as are suited to the particular use contemplated.

What is claimed is:

1. A method comprising:
monitoring, by a controller, transmission characteristics of concurrently-transmitting first and second transmitters of a communication device having at least two transmitters;
determining whether a human is within a proximity threshold distance to the first and second transmitters;
in response to determining that the human is within the proximity threshold distance, determining whether concurrent transmissions by the first and second transmitters have an aggregated power level that exceeds a power threshold; and in response to determining that the aggregated power level exceeds the power threshold, triggering, by the controller, operation in a reduced transmit power mode that reduces the aggregate power level to not exceed the power threshold and that includes communication quality mitigation.

2. The method of claim 1, wherein triggering operation in the reduced transmit power mode comprises:

reducing the transmit power level of at least one of the first and second transmitters;

communicating the transmit power levels of the first and second transmitters to at least one network node that schedules communication with the first and second transmitters; and receiving from the at least one network node a transmission characteristic change for the selected one of the first and second transmitters to optimize communication quality at the reduced transmit power level.

3. The method of claim 2, wherein receiving from the at least one network node the transmission characteristic change comprises receiving a selected at least one of: (i) coding gain; (ii) data rates; and (iii) transmission times for the selected one of the first and second transmitters to optimize communication quality at the reduced transmit power level.

4. The method of claim 3, further comprising increasing the transmit power level of the at least one of the first and second transmitters in response receiving from the at least one network node the transmission characteristic comprising different transmission times for the first and second transmitters.

5. The method of claim 1, wherein triggering operation in the reduced transmit power mode comprises reducing transmit power level of a selected one of the first and second transmitters based on the selected one having a lower priority of traffic than the other transmitter.

6. The method of claim 1, wherein triggering operation in the reduced transmit power mode comprises assigning traffic scheduled respectively for the first and second transmitters to a selected one of the transmitters and turning off the other transmitter.

7. A communication device comprising:

first and second transmitters that transmit concurrently; and a controller communicatively coupled with the first and second transmitters and that executes a transmit power control utility that enables the communication device to:

monitor transmission characteristics of first and second transmitters;

determine whether a human is within a proximity threshold distance to the first and second transmitters;

in response to determining that the human is within the proximity threshold distance, determine whether concurrent transmissions by the first and second transmitters have an aggregated power level that exceeds a power threshold; and in response to determining that the aggregated power level exceeds the power threshold, trigger operation in a reduced transmit power mode that reduces the aggregate power level to not exceed the power threshold and that includes communication quality mitigation.

8. The communication device of claim 7, wherein to trigger operation in the reduced transmit power mode, the controller enables the communication device to:

reduce the transmit power level of at least one of the first and second transmitters;

communicate the transmit power levels of the first and second transmitters to at least one network node that schedules communication with the first and second transmitters; and receive from the at least one network node a transmission characteristic change for the selected one of the first and second transmitters to optimize communication quality at the reduced transmit power level.

9. The communication device of claim 8, wherein the controller receives from the at least one network node the transmission characteristic change comprising receiving a selected at least one of: (i) coding gain; (ii) data rates; and (iii) transmission times for the selected one of the first and second transmitters to optimize communication quality at the reduced transmit power level.

10. The communication device of claim 9, wherein the controller increases the transmit power level of the at least one of the first and second transmitters in response receiving from the at least one network node the transmission characteristic comprising different transmission times for the first and second transmitters.

11. The communication device of claim 7, wherein to trigger operation in the reduced transmit power mode, the controller enables the communication device to reduce transmit power level of a selected one of the first and second transmitters based on the selected one having a lower priority of traffic than the other transmitter.

12. The communication device of claim 7, wherein to trigger operation in the reduced transmit power mode, the controller enables the communication device to assign traffic scheduled respectively for the first and second transmitters to a selected one of the transmitters and turning off the other transmitter.

13. A computer program product comprising:

a computer readable storage device; and program code on the computer readable storage device that when executed by a processor associated with a communication device, the program code enables the communication device to provide the functionality of:

monitor transmission characteristics of concurrently-transmitting first and second transmitters of a communication device;

determine whether a human is within a proximity threshold distance to the first and second transmitters;

in response to determining that the human is within the proximity threshold distance, determine whether concurrent transmissions by the first and second transmitters have an aggregated power level that exceeds a power threshold; and in response to determining that the aggregated power level exceeds the power threshold, trigger operation in a reduced transmit power mode that reduces the aggregate power level to not exceed the power threshold and that includes communication quality mitigation.

14. The computer program product of claim 13, wherein, to trigger operation in the reduced transmit power mode, the program code enables the communication device to provide the functionality of:

reducing the transmit power level of at least one of the first and second transmitters;

communicating the transmit power levels of the first and second transmitters to at least one network node that schedules communication with the first and second transmitters; and receiving from the at least one network node a transmission characteristic change for the selected one of the first and second transmitters to optimize communication quality at the reduced transmit power level.

15. The computer program code of claim 14, wherein the transmission characteristic change comprises a selected at least one of: (i) coding gain; (ii) data rates; and (iii) transmission times for the selected one of the first and second transmitters to optimize communication quality at the reduced transmit power level.

16. The computer program code of claim 15, wherein the program code enables the communication device to provide the functionality of increasing the transmit power level of the at least one of the first and second transmitters in response receiving from the at least one network node the transmission characteristic comprising different transmission times for the first and second transmitters.

17. The computer program code of claim 13, wherein, to trigger operation in the reduced transmit power mode, the program code enables the communication device to provide the functionality of reducing transmit power level of a selected one of the first and second transmitters based on the selected one having a lower priority of traffic than the other transmitter.

18. The computer program code of claim 13, wherein, to trigger operation in the reduced transmit power mode, the program code enables the communication device to provide the functionality of assigning traffic scheduled respectively for the first and second transmitters to a selected one of the transmitters and turning off the other transmitter.

* * * * *